US005971417A

United States Patent [19]

[11] Patent Number: 5,971,417

[45] Date of Patent: Oct. 26, 1999

Swisshelm et al.

[54] WHEELCHAIR WITH PIVOTAL BACK REST

[75] Inventors: Peter A. Swisshelm, Boulder; Douglas H. Munsey, Longmont, both of Colo.

[73] Assignee: Sunrise Medical HHG Inc., Longmont, Colo.

[21] Appl. No.: 08/748,016

[22] Filed: Nov. 12, 1996

[51] Int. Cl.[6] .................................................. B62H 1/00

[52] U.S. Cl. .................................. 280/304.1; 297/DIG. 4

[58] Field of Search ............................ 280/250.1, 304.1; 297/301.1, 291, 354.12, DIG. 4

[56] References Cited

U.S. PATENT DOCUMENTS

| | | |
|---|---|---|
| 5,062,677 | 11/1991 | Jay et al. . |
| 5,149,173 | 9/1992 | Jay et al. . |
| 5,211,446 | 5/1993 | Jay et al. . |
| 5,364,162 | 11/1994 | Bar et al. . |
| 5,407,248 | 4/1995 | Jay et al. . |
| 5,524,971 | 6/1996 | Jay et al. . |
| 5,556,168 | 9/1996 | Dinsmoor, III et al. . |
| 5,593,211 | 1/1997 | Jay et al. . |
| 5,782,536 | 7/1998 | Heidmann et al. ................ 297/440.15 |

*Primary Examiner*—Lanna Mai
*Assistant Examiner*—Faye M. Fleming
*Attorney, Agent, or Firm*—MacMillan, Sobanski & Todd, LLC

[57] ABSTRACT

A back rest assembly (22) including a back shell (24), a back rest cushion (26), and a mounting assembly (28) for securing back shell (24) to upright posts (16, 18) that form part of the frame of a wheelchair (10). Mounting assembly 28 includes a mounting block (30), a pair of resilient pads (32), a fastener band (34), a barrel nut (38), and a pivot pin (36). Mounting assembly (28) pivotally supports back shell (24) between upright posts (16, 18) at two pivot points on the posts. Mounting assembly (28) is adjustably secured on each post (16, 18) so that the pivot points can be positioned to align with a person's pelvis.

28 Claims, 6 Drawing Sheets

WHEELCHAIR WITH PIVOTAL BACK REST

TECHNICAL FIELD

The present invention pertains to wheelchairs and, more particularly, to adjustable back rest mechanisms for such chairs.

BACKGROUND ART

U.S. Pat. No. 5,062,677 of Jay et al, entitled "Wheelchair Back System," discloses a wheelchair back assembly that provides a high degree of support and adjustability in order to accomplish various therapeutically important functions. This patent discusses several back related problems faced by wheelchair users, such as kyphosis, scoliosis, instability, redness of the spine, and general back pain. The discussion therein provides good background for understanding some of the back related issues addressed by the present invention.

A common back rest problem faced by wheelchair users and particularly by paraplegics is the inherent difficulty in changing one's pants or pulling one's pants down and back up again when using the bathroom from a wheelchair. Prior art wheelchairs commonly employ back rests that pivot relative to a seat base, but such designs are awkward solutions to the problems associated with the simple task of manipulating one's pants while seated.

Accordingly, it is an object of the present invention to provide a back rest assembly for a wheelchair that can better accommodate the body movements necessary for dressing while seated.

It is another object of the present invention to provide such a back rest assembly that while capable of functioning as a back rest, also provides firm, comfortable support, during normal use, and does so in a manner that allows maximum movement of the torso.

DISCLOSURE OF THE INVENTION

Briefly described, the present invention comprises a pivotal back rest assembly for a wheelchair having a pair of laterally spaced upright posts. The pivotal back rest assembly includes a back rest shell pivotally mounted laterally between the upright posts, a back rest cushion secured to the back rest shell, and a mounting assembly for pivotally securing the back rest shell to the upright posts. The mounting assembly includes a mounting block secured to each post, and each mounting block has a vertical dimension. A pair of pads are secured to each mounting block, one above the other along said vertical dimension. A pivot mechanism is provided for each mounting block for securing the back rest shell to the upright post at a point vertically between the pads. The back rest shell has a vertical dimension sufficient to overlay and engage the pads of the mounting assembly. In use, the back rest shell pivots about a point between the pads so that pivoting of the back rest shell in a first direction is resisted by one of the pads and pivoting of the back rest shell in an opposite direction is resisted by the other pad. Both pads resist pivoting of the back rest in a manner that returns the back rest to a neutral position.

According to an aspect of the invention, the back rest shell includes a pair of brackets for securing the back rest shell to the upright posts, and the back rest shell is mounted laterally between the upright posts. In this manner, the back rest shell pivots from two pivot points about the upright posts.

Preferably, each bracket is U-shaped and defines an area for receiving one of the mounting blocks and its associated pair of pads. Each U-shaped bracket is formed by a back wall and a pair of side walls. The back wall is adapted to mate against the pair of pads and be biased by the pads to a neutral position. The side walls each include aligned openings for receiving a pivot pin, and the mounting block is adapted to pivotally carry the pivot pin in a manner permitting pivoting of the back rest shell about a point between the pads.

According to another aspect of the invention, the mounting blocks are each adjustably secured to an upright post in a manner permitting the pivot point to be adjusted vertically to correspond with a person's pelvis.

According to another aspect of the invention, the resilient pads are removably mounted on their respective mounting blocks, and wherein additional resilient pads are provided that have a hardness different from that of the first set of pads, so that the biasing force of the pads can be adjusted to suit a particular user.

Preferably, each mounting block includes dovetailed slots for receiving the pads, and the dovetailed slots are aligned substantially horizontally. The pads are held within the dovetail slots by the U-shaped brackets.

According to another aspect of the invention, the back rest shell includes a backwardly curved top edge. This enables a user to lean back over the back rest shell without experiencing any pressure points.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWING

Throughout the several views, like reference numerals refer to like parts, wherein.

BEST MODE OF CARRYING OUT THE INVENTION

Figure 1:
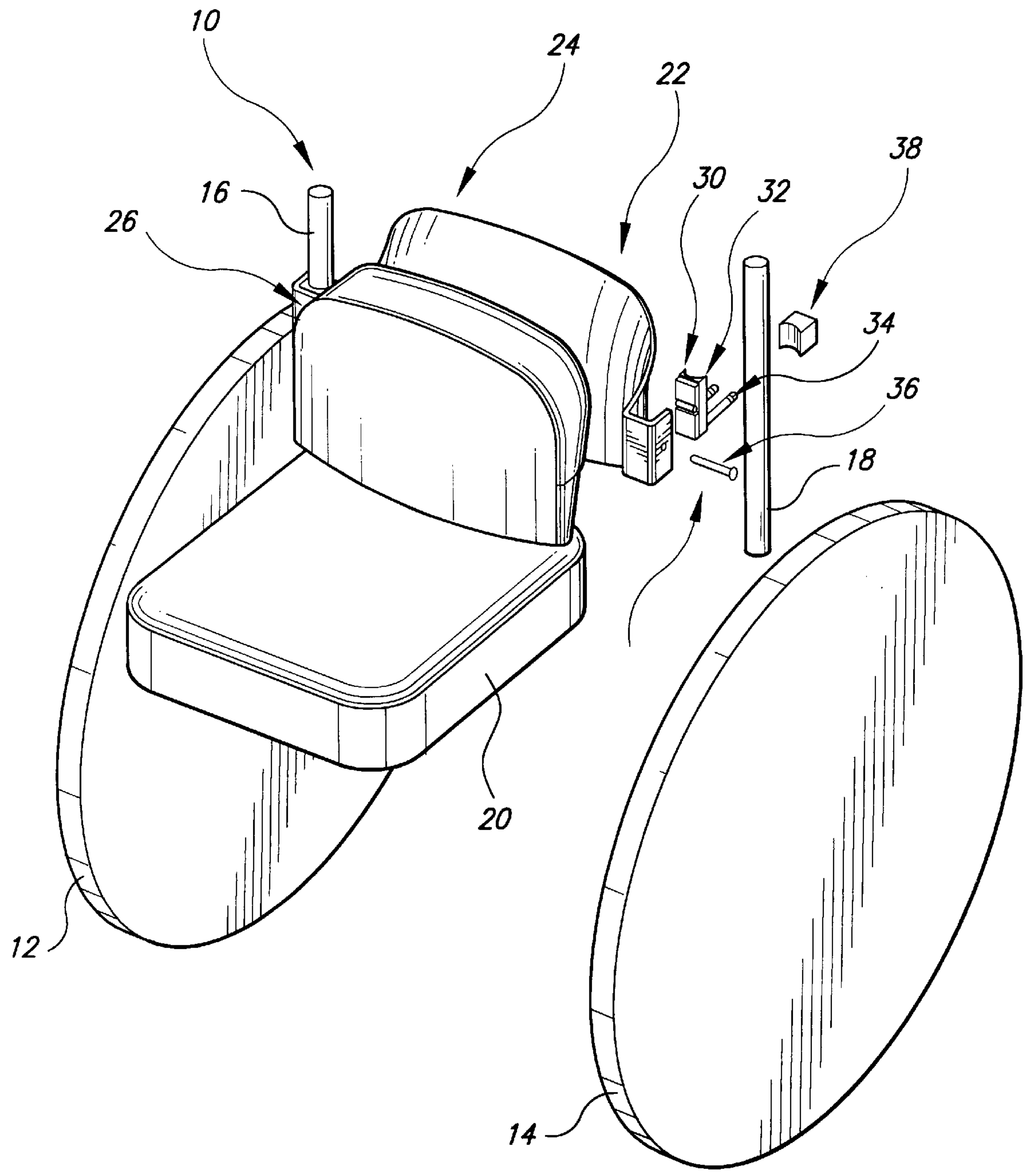
FIG. 1 is a schematic pictorial view of the wheelchair of the present invention.

Referring to FIG. 1, a wheelchair 10 is shown schematically to include a pair of wheels 12, 14 and a pair of laterally spaced upright posts 16, 18, which form part of the frame of wheelchair 10. Wheelchair 10 also includes a seat 20 that is attached to the frame of wheelchair 10. The rest of the wheelchair frame, a second set of wheels, a seat frame, and a footrest assembly are not shown, but may comprise any conventional design known in the art for these components. The present invention is directed to an adjustable back rest assembly 22, which comprises a back shell 24 pivotally mounted between upright posts 16, 18, a foam and cover back rest cushion 26 releasably secured to back shell 24, and a mounting assembly 28 for securing back shell 24 to upright posts 16, 18.

Mounting assembly 28 includes a mounting block 30, a pair of elastomeric pads 32 that are carried on mounting block 30, a fastener band 34 and barrel nut 38 for securing mounting block 30 to upright post 18, and a pivot pin 36, which pivotally mounts back shell 24 to mounting block 30. A similar mounting assembly (not shown) secures back shell 24 to upright post 16. Mounting assembly 28 functions as a pivot mechanism for pivotally securing back rest shell 24 to the wheelchair.

Figure 4:
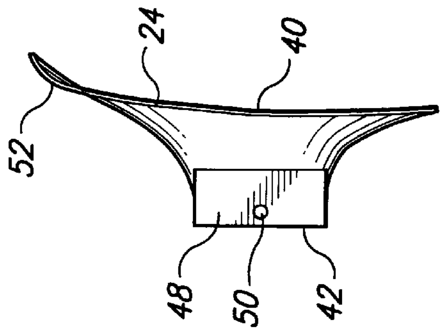
FIG. 4 is a side view of the back shell piece of FIG. 2.
Figure 2:
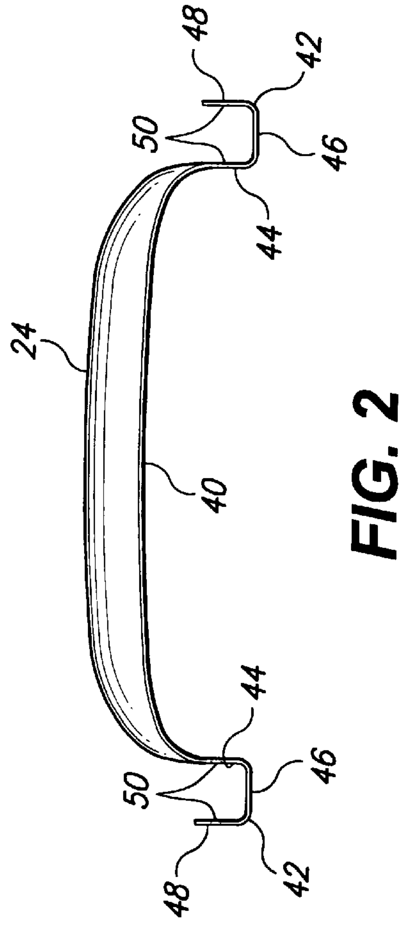
FIG. 2 is a top view of the back shell piece of the wheelchair of FIG. 1.
Figure 3:
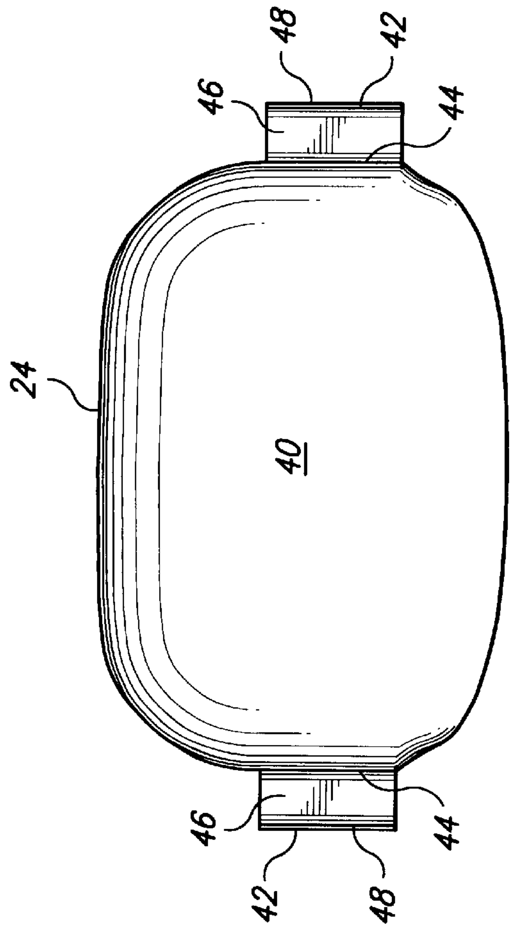
FIG. 3 is a back view of the back shell piece of FIG. 2.
Figure 5:
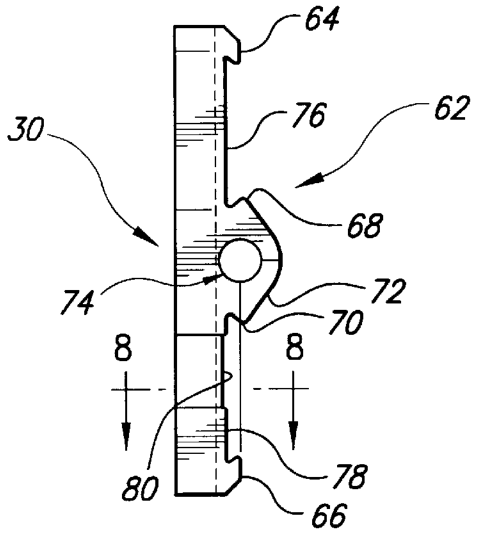
FIG. 5 is a side view of the mounting block of the mounting assembly for securing the back shell of FIG. 2 to the wheelchair of FIG. 1.
Figure 6:
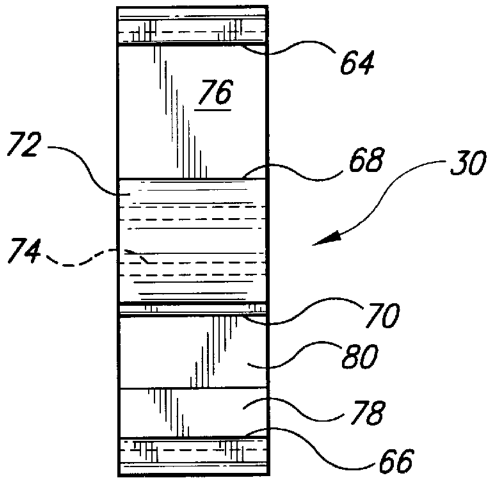
FIG. 6 is a front view of the mounting block of FIG. 5.
Figure 7:
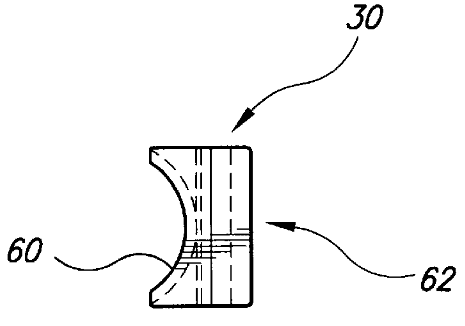
FIG. 7 is a top view of the mounting block of FIG. 5.
Figure 8:
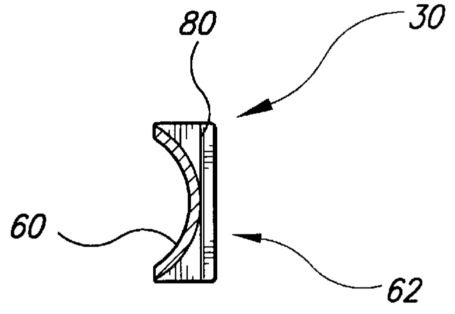
FIG. 8 is a sectional view of the mounting block taken along the lines 8—8 of FIG. 5.

FIGS. 2–4 illustrate the design of back shell 24. Back shell 24 includes a contoured back shell body 40 and a pair of U-shaped mounting brackets 42. Back shell body 40 is contoured in such a way as to minimize the loss of seat depth when using the back rest assembly. Mounting brackets 42 are formed integrally with shell body 40. Mounting brackets 42 each include an inner side wall 44, a back wall 46 and an outer side wall 48. Side walls 44, 48 include aligned openings 50 for receiving each a pivot pin.

The top portion 52 of shell body 40 is curved backwardly, as shown in FIG. 4, to allow a wheelchair user to lean back against the upper portion of shell body 40 without experiencing any pressure points.

FIGS. 5–8 illustrate the design of mounting block 30. Mounting block 30 is an elongated rectangular shaped piece that has an arcuate, concave back side 60 shaped to conform with the round contour of an upright post. The front side 62 of mounting block 30 is generally flat and includes an upper ridge 64, a lower ridge 66 and a pair of intermediate ridges 68, 70 formed by a raised center hub 72. Hub 72 includes opening 74 for receiving pivot pin 36. Flanges 64, 66, 68, 70 form dovetail slots 76, 78, each for receiving a resilient pad 32. The lower dovetail slot 78 includes a recessed area 80, which can be seen in FIG. 8. Recessed area 80 receives the fastener band 34 to secure mounting block 30 to an upright post.

Figure 9:
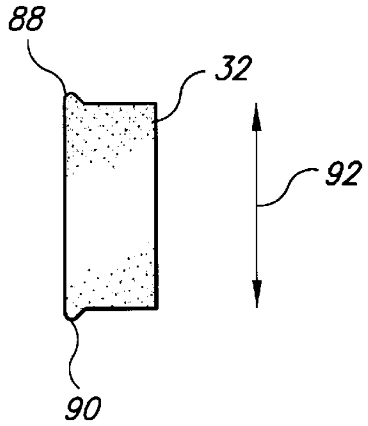
FIG. 9 is a side view of a resilient pad for securing to the mounting block of FIG. 5.
Figure 10:
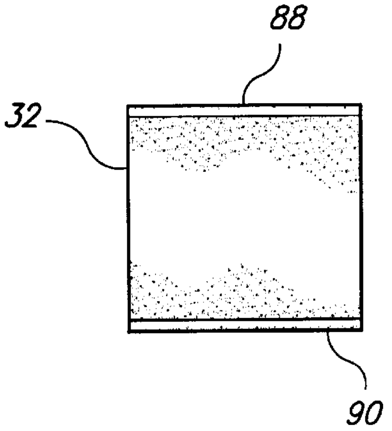
FIG. 10 is a front view of the resilient pad of FIG. 9.

FIGS. 9 and 10 illustrate the design of a resilient pad 32. The resilient pad 32 is generally rectangular in shape and includes inner raised rims 88, 90, which creates a dovetail that is received within dovetail slots 76, 78. The width of resilient pads 32, as indicated by arrow 92, corresponds with the space or distance between the edges of ridges 64, 68 and the edges of ridges 66, 70. The resilient pads are shaped with a dovetail so that they can slide into the dovetail slots from the side and then are retained by the back shell itself when it is installed. The elastomeric material of resilient pads 32 can be selectively varied from a low durometer, "soft", to a high durometer, "hard", elastomer. The soft material will allow the back to pivot more for a given force than the hard material. This allows the user to select elastomers for their back support which meet their needs. If necessary the elastomers could be replaced altogether by non-compressible blocks which would completely eliminate the movement of the back support.

Figure 13:
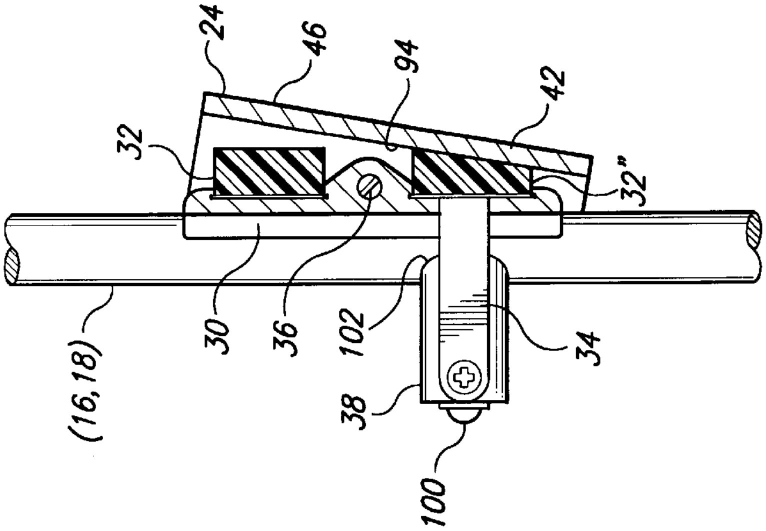
FIG. 13 is a view like FIGS. 11 and 12, shown with the back shell pivoted forwardly in a manner that depresses the lower resilient pad.
Figure 12:
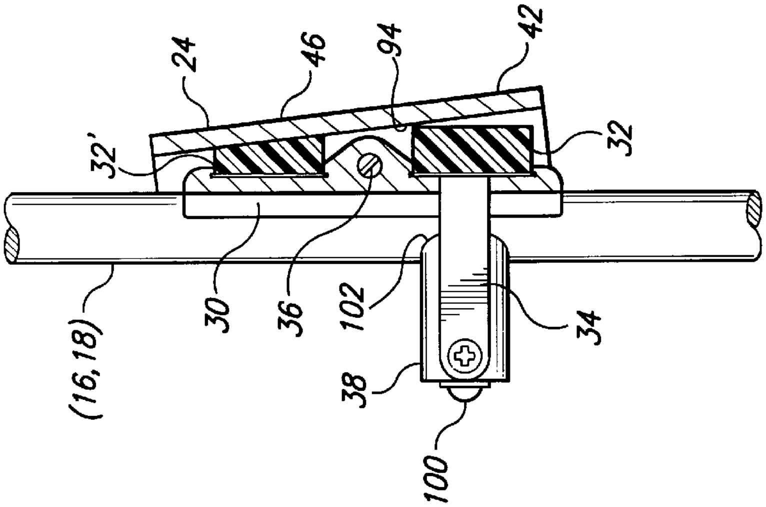
FIG. 12 is a view like FIG. 11, shown with the back shell pivoted backwardly in a manner that depresses the upper resilient pad.
Figure 11:
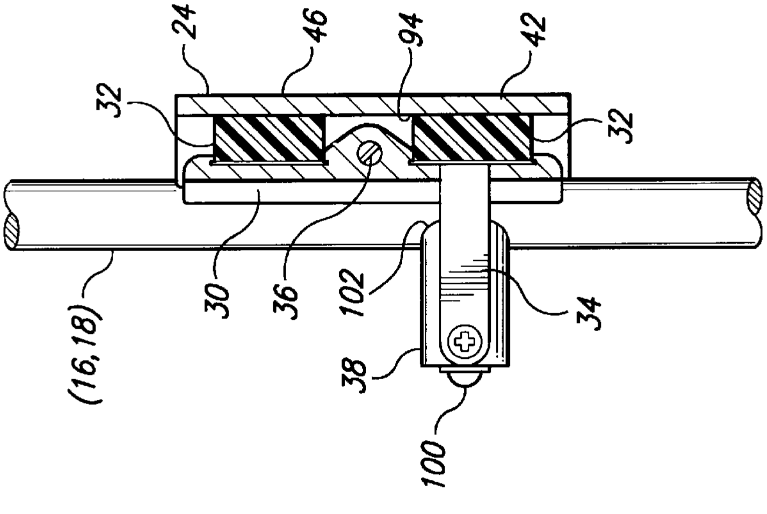
FIG. 11 is a sectional view of the mounting assembly for securing the back shell of FIG. 2 to the wheelchair of FIG. 1, shown mounted on an upright post that forms part of the wheelchair frame.
Figure 17:
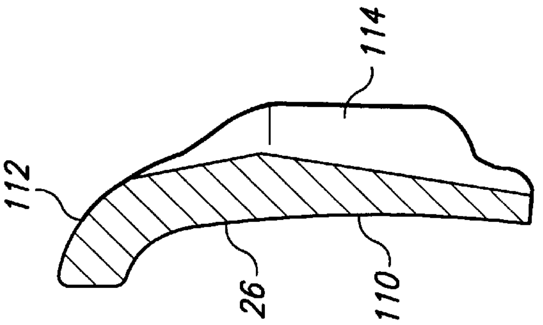
FIGS. 14–17 are various views showing the back rest cushion for placement on the back shell of FIG. 2.
Figure 16:
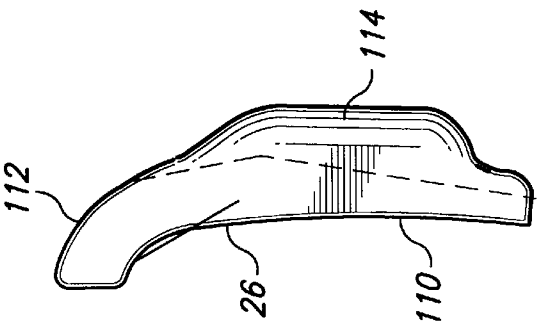
Figure 14:
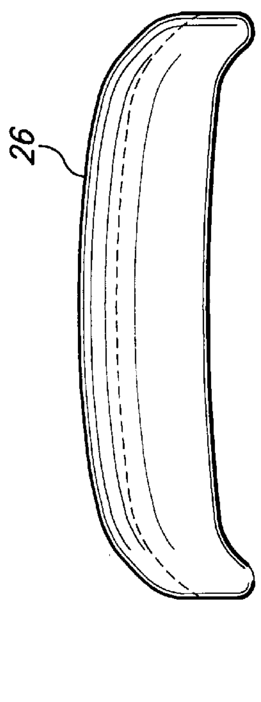
Figure 15:
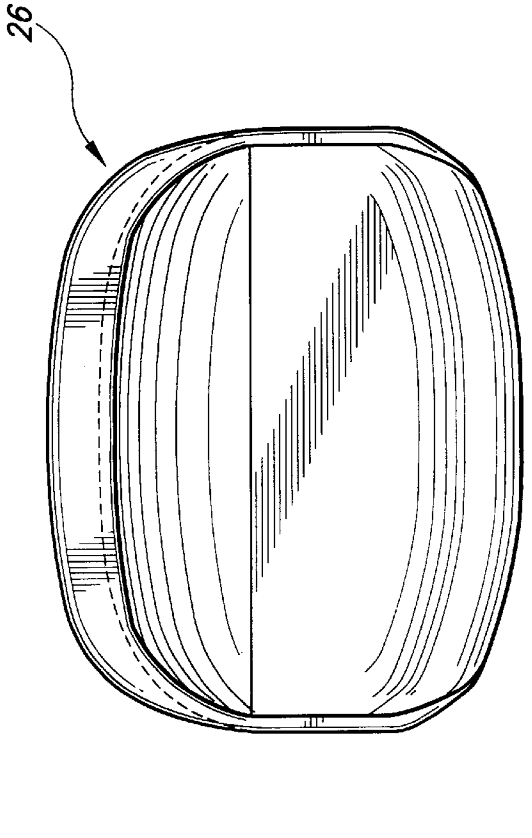

FIGS. 11–13 illustrate the pivotal movement of back shell 24. In FIGS. 11–13, only the back wall 46 of brackets 42 are shown. Bracket 42 is shown secured to mounting block 30 by means of pivot pin 36. Pivot pin 36 is retained in mounting bracket 42 by means of a retainer pin. This creates a permanent type mounting arrangement for the back shell. When bracket 42 is secured to mounting block 30, the inside surface 94 of back wall 46 engages resilient pads 32.

The fastener band 34 is shown extending around mounting block 30 between the block and lower resilient pad 32. Fastener band 34 is secured to barrel nut 38 that is adjustable relative to fastener band 34 by means of an adjustment screw 100. Barrel nut 38 includes a contoured concaved inner end 102 that conforms with the round contour of upright posts 16, 18.

In FIG. 11, back shell 24 is shown in a neutral position wherein each resilient pad 32 acts as a biasing element by engaging back wall 46 of bracket 42 and generally aligning bracket 42 with upright posts 16, 18. Back wall 46 is formed in such a way that there is approximately a 3" high flat facing the mounting block. The aligned holes in bracket 42 are drilled so that the flat of back wall 46 aligns with the mounting block. Between back wall 46 and mounting block 30, resilient, elastomeric pads 32 are positioned. In FIG. 12, back shell 24 is shown pivoted backwardly, wherein back wall 46 depresses the upper resilient pad 32'. In this manner, resilient pad 32' provides a biasing force against backward pivoting movement of back shell 24. In FIG. 13, back shell 24 is shown pivoted forwardly wherein back wall 46 depresses the lower resilient pad 32". Similarly, resilient pad 32" provides a biasing force against forward pivoting movement of back shell 24. When the user of the wheelchair releases back pressure from back shell 24, from either of the pivoted positions shown in FIGS. 12, 13, the back shell will return to the neutral position shown in FIG. 11. Thus, it can be seen that pads 32 function as a biasing means for biasing the back rest shell to a neutral position.

The pivoting back rest shell is extremely useful in allowing the user to lean back over the top of the back. Also this design makes for a very comfortable back support. The location of the pivot point is such that while the back can pivot, the pelvis is always located in the same position, which creates a comfortable and stable seating environment for the user.

FIGS. 14–17 illustrate the design of back rest cushion 26. Back rest cushion 26 includes a foam core surrounded by a stretchable fabric cover. Back rest cushion 26 includes an inner side wall 110 that conforms with the shape of back shell 24. The upper edge portion 112 is curved backwardly to conform with the backward curvature of the top edge 52 of back shell 24, to help protect the user. Back rest cushion 26 also includes forwardly extending lateral side edges 114, which provide lateral support for the user of the wheelchair. Preferably, Velcro-type fasteners are used to secure back rest cushion 26 to back shell 24 in a manner permitting adjustment of the position of back rest cushion 26 on back shell 24.

The adjustable back rest assembly 22 provides low back support for a wheelchair user who has good trunk stability. Specifically, back rest assembly 22 supports the top of the pelvis, helping to promote upright posture and keeping the user to the back of the wheelchair. In addition, back rest assembly 22 is much more solid and stable than a conventional sling back.

The mounting assembly 28 allows back shell 24 to pivot about the axis of pivot pin 36. When properly installed, this axis aligns with the top of the user's pelvic region, allowing the user to pivot about this axis without changing the positioning of their pelvis.

Figure 18:
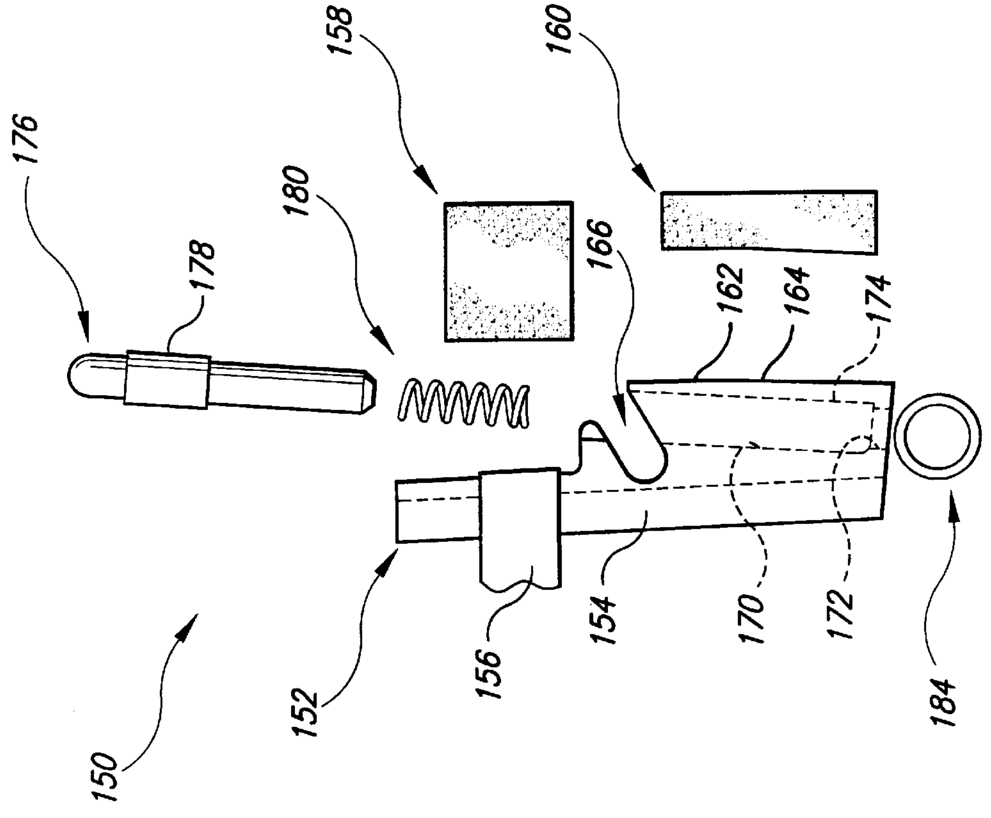
FIGS. 18-19 are a sectional view and an exploded view of alternative embodiment for the mounting assembly of the back rest assembly of the present invention.
Figure 19:
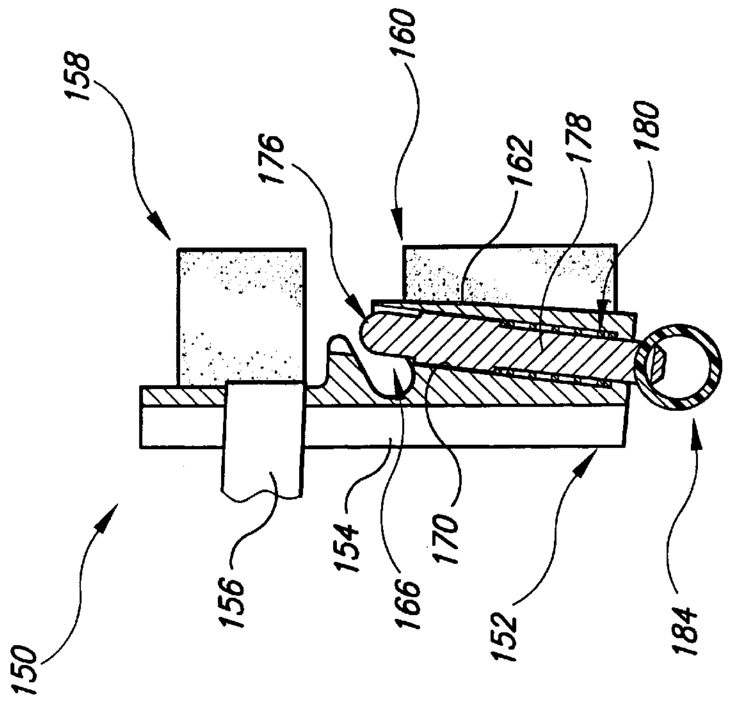

An alternative mounting assembly 150 is shown in FIGS. 18-19. Mounting assembly 150 includes a mounting block 152 that has a curved back side 154 similar to the mounting block of the first embodiment. A recessed band 156 extends around mounting block 152 for receiving the band of a fastener similar to that disclosed herein with reference to FIG. 11. Dovetail slots (not shown) provide for attachment of an upper elastomeric pad 158 and a lower elastomeric pad 160 to the front side 162 of mounting block 150.

Mounting block 152 includes a wider lower section 164 that has formed in it a U-shaped slot 166 that angles upwardly. Lower section 164 also includes a lengthwise bore 170 that intersects U-shaped slot 166. Bore 170 includes a narrow diameter lower end 172 that forms a shoulder 174. A latch pin 176 having a wider diameter land portion 178 is movably positioned in bore 170. A bias spring 180 surround the lower half of latch pin 176 and engages at one end the shoulder 174 and at its other end engages land portion 178. A lanyard 184 is secured at the lower end of latch pin 176. Spring 180 biases latch pin 176 upwardly so that the upper end of the latch pin protrudes into U-shaped slot 166.

The pivot pin 36 shown in FIG. 1 is inserted into slot 166 in a manner that depresses latch pin 176 downwardly into bore 174, allowing the pivot pin to seat at the base of U-shaped slot 166. Latch pin 176 then releases upwardly to block escape of the pivot pin. Lanyard 184 is pulled downwardly to release latch pin 176 and allow removal of the pivot pin and back shell piece as a unit. This version is not as low profile as the permanent mounting assembly, but it allows the back shell to be easily removable from the mounts.

The pivoting back rest assembly of the present invention is much less limiting to movement of the torso as compared to a sling back-type back rest, which tends to promote poor posture. The vertical adjustment feature of the back rest assembly and the pivotal feature provide for proper positioning of the back rest and movement of the torso in a manner that increases user support, comfort, and degree of freedom of movement.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

What is claimed is:

1. A wheelchair, comprising a frame including a pair of laterally spaced upright posts, a seat carried on the frame, a pair of wheels for movably supporting the frame, a back rest pivotally mounted laterally between the upright posts, and a mounting assembly for pivotally securing the back rest to the upright posts, the mounting assembly including (1) a mounting block secured to each post, each mounting block having a vertical dimension, (2) a pair of resilient pads secured to each mounting block, one above the other along said vertical dimension, and (3) a pivot mechanism for securing the back rest to the mounting blocks at a point vertically between the pads, the back rest having a vertical dimension sufficient to overlay and engage the pads of each mounting assembly, whereby the back rest pivots about a point vertically between the pads so that pivoting of the back rest in a first direction is resisted by one of the pads and pivoting of the back rest in an opposite direction is resisted by the other pad, both pads resisting pivoting of the back rest in a manner that returns the back rest to a neutral position.

2. The wheelchair of claim 1, wherein the back rest includes a pair of brackets for securing the back rest to the mounting blocks.

3. The wheelchair of claim 2, wherein the brackets each form lateral extensions on the back rest.

4. The wheelchair of claim 3, wherein each bracket is U-shaped and defines an area for receiving one of the mounting blocks and its associated pair of pads.

5. The wheelchair of claim 4, wherein each U-shaped bracket is formed by a back wall and a pair of side walls, the back wall adapted to mate against the pair of pads and be biased by the pads to a neutral position.

6. The wheelchair of claim 5, wherein the side walls each include aligned openings for receiving a pivot pin, the mounting block adapted to pivotally carry the pivot pin in a manner permitting pivoting of the back rest about a pivot point between the pads.

7. The wheelchair of claim 1, wherein the mounting blocks are each adjustably secured to a post in a manner permitting the pivot point to be adjusted vertically to correspond with a person's pelvis.

8. The wheelchair of claim 1, wherein the resilient pads are removably mounted on their respective mounting blocks, and further comprising additional resilient pads having a hardness different from that of the first-named pads, so that the biasing forces of the pads can be adjusted to suit a particular user.

9. The wheelchair of claim 8, wherein each mounting block includes dovetailed slots for receiving the pads.

10. The wheelchair of claim 9, wherein the dovetail slots are aligned substantially horizontally.

11. The wheelchair of claim 10, wherein the back rest includes a pair of brackets for securing the back rest to the mounting blocks, each bracket being U-shaped and defining an area for receiving one of the mounting blocks and its associated pair of pads, and wherein the pads are held within the dovetail slots by the U-shaped brackets.

12. A pivotal back rest assembly for a wheelchair including a pair of laterally spaced upright posts, the pivotal back rest assembly comprising a back rest shell for pivotally mounting laterally between the upright posts, a back rest cushion secured to the back rest shell, and a mounting assembly for pivotally securing the back rest shell to the upright posts, the mounting assembly including (1) a mounting block secured to each post, each mounting block having a vertical dimension, (2) a pair of pads secured to the mounting block, one above the other along said vertical dimension, and (3) a pivot mechanism for securing the back rest shell to the upright posts at a point vertically between the pads, the back rest shell having a vertical dimension sufficient to overlay and engage the pads of a mounting assembly, whereby the back rest shell pivots about a point between the pads so that pivoting of the back rest shell in a first direction is resisted by one of the pads and pivoting of the back rest shell in an opposite direction is resisted by the other pad, both pads resisting pivoting of the back rest in a manner that returns the back rest to a neutral position.

13. The back rest assembly of claim 12, wherein the back rest shell includes a pair of brackets for securing the back rest shell to the upright posts.

14. The back rest assembly of claim 13, wherein the brackets each form lateral extensions on the back rest.

15. The back rest assembly of claim 13, wherein each bracket is U-shaped and defines an area for receiving one of the mounting blocks and its associated pair of pads.

16. The back rest assembly of claim 15, wherein each U-shaped bracket is formed by a back wall and a pair of side walls, the back wall adapted to mate against the pair of pads and be biased by the pads to a neutral position.

17. The back rest assembly of claim 16, wherein the side walls each include aligned openings for receiving a pivot pin, the mounting block adapted to pivotally carry the pivot pin in a manner permitting pivoting of the back rest shell about a point between the pads.

18. The back rest assembly of claim 12, wherein the mounting blocks are each adjustably secured to a post in a manner permitting the pivot point to be adjusted vertically to correspond with a person's pelvis.

19. The back rest assembly of claim 12, wherein the resilient pads are removably mounted on their respective mounting blocks, and further comprising additional resilient pads having a hardness different from that of the first-named pads, so that the biasing force of the pads can be adjusted to suit a particular user.

20. The back rest assembly of claim 19, wherein each mounting block includes dovetailed slots for receiving the pads.

21. The back rest assembly of claim 20, wherein the dovetailed slots are aligned substantially horizontally.

22. The back rest assembly of claim 21, wherein the back rest shell includes a pair of brackets for securing the back rest to the mounting blocks, each bracket being U-shaped and defining an area for receiving one of the mounting blocks and its associated pair of pads, and wherein the pads are held within the dovetail slots by the U-shaped brackets.

23. The back rest assembly of claim 12, wherein the back rest shell includes a backwardly curved top edge.

24. The back rest assembly of claim 12, wherein the back rest shell is removably mounted to the upright posts.

25. The back rest assembly of claim 24, wherein the back rest shell is removably mounted by means of a releasable latch mechanism.

26. A back rest assembly for a wheelchair comprising, a back rest shell for pivotally mounting on the wheelchair, a back rest seat cushion secured to the back rest shell, a pivot mechanism for pivotally securing the back rest shell to the wheelchair in a manner permitting forward and rearward pivoting of the back rest shell, and biasing means for biasing the back rest shell to a neutral position, wherein the baising means further includes means for biasing against both forward and rearward movement of the back rest assembly.

27. A back rest assembly for a wheelchair comprising, a back rest shell for pivotally mounting on the wheelchair, a back rest seat cushion secured to the back rest shell, a pivot mechanism for pivotally securing the back rest shell to the wheelchair in a manner permitting forward and rearward pivoting of the back rest shell, and biasing means for biasing the back rest shell to a neutral position, wherein the baising means includes a pair of biasing elements, positioned on opposite sides of the pivot point of the pivot mechanism, wherein each biasing element includes a resilient pad, one positioned above the pivot point and one positioned below the pivot point.

28. A back rest assembly for a wheelchair comprising, a back rest shell for pivotally mounting on the wheelchair, a back rest seat cushion secured to the back rest shell, a pivot mechanism for pivotally securing the back rest shell to the wheelchair in a manner permitting forward and rearward pivoting of the back rest shell, and biasing means for biasing the back rest shell to a neutral position, wherein the pivoting mechanism releasably secures the back rest shell to the wheelchair, and further comprising a latch mechanism for fastening the back rest shell to the wheelchair, wherein the pivot mechanism includes a pivot pin carried within a slot, and the latch mechanism includes a latch pin movable from a first position blocking release of the pivot pin from the slot to a second position allowing removal of the pivot pin from the slot.

* * * * *